(12) United States Patent
Crane et al.

(10) Patent No.: US 12,144,060 B2
(45) Date of Patent: Nov. 12, 2024

(54) CELLULAR SIGNAL MESH NETWORK

(71) Applicant: Micron Technology, Inc., Boise, ID (US)

(72) Inventors: Kari Crane, Meridian, ID (US); Deepti Verma, Boise, ID (US); Shruthi Kumara Vadivel, Boise, ID (US); Tomoko Ogura Iwasaki, San Jose, CA (US); Sue-Fern Ng, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 238 days.

(21) Appl. No.: 17/365,119

(22) Filed: Jul. 1, 2021

(65) Prior Publication Data

US 2023/0007466 A1 Jan. 5, 2023
US 2024/0284161 A9 Aug. 22, 2024

Related U.S. Application Data

(60) Provisional application No. 63/127,045, filed on Dec. 17, 2020.

(51) Int. Cl.
*H04W 8/18* (2009.01)
*H04B 17/318* (2015.01)
*H04W 28/18* (2009.01)
*H04W 52/02* (2009.01)

(52) U.S. Cl.
CPC .......... *H04W 8/183* (2013.01); *H04B 17/318* (2015.01); *H04W 28/18* (2013.01); *H04W 52/0229* (2013.01); *H04W 52/0261* (2013.01)

(58) Field of Classification Search
CPC . H04W 8/183; H04W 28/18; H04W 52/0229; H04W 52/0261; H04W 36/03; H04W 84/18; H04W 88/04; H04B 17/318
See application file for complete search history.

(56) References Cited

U.S. PATENT DOCUMENTS 8,923,186 B1 12/2014 daCosta
8,976,733 B2 3/2015 daCosta
9,019,956 B2 4/2015 daCosta
(Continued)

FOREIGN PATENT DOCUMENTS

AU 2018202458 B2 4/2018

*Primary Examiner* — John J Lee
(74) *Attorney, Agent, or Firm* — Brooks, Cameron & Huebsch, PLLC

(57) ABSTRACT

Methods and devices related to a cellular signal mesh network are described. In an example, a method can include determining, via a processing resource of a first computing device, whether a cellular signal of the first computing device is below a threshold cellular signal, transmitting from the first computing device to a second computing device first signaling including data representing a request for operational data of the second computing device in response to determining that the cellular signal of the first computing device is below the threshold cellular signal, receiving from the second computing device second signaling comprising the operational data of the second computing device, and transmitting from the first computing device to the second computing device third signaling including data representing at least one of: a voice call, a video call, or a message in response to receiving the second signaling comprising the operational data.

19 Claims, 3 Drawing Sheets

(56) References Cited

U.S. PATENT DOCUMENTS

| | | |
|---|---|---|
| 9,258,765 B1 | 2/2016 | daCosta |
| 9,363,651 B1 | 6/2016 | daCosta |
| 9,853,719 B2 | 12/2017 | Krochmal |
| 10,630,937 B1 * | 4/2020 | Low .................. H04M 1/72439 |
| 2017/0280487 A1 * | 9/2017 | Price ..................... H04W 36/14 |
| 2020/0202376 A1 * | 6/2020 | Benoliel ............... H04W 4/025 |

* cited by examiner

CELLULAR SIGNAL MESH NETWORK

PRIORITY INFORMATION

This application is a Non-Provisional Application of U.S. Provisional Application No. 63/127,045, filed Dec. 17, 2020, the contents of which are herein incorporated by reference.

TECHNICAL FIELD

The present disclosure relates generally to a cellular signal mesh network.

BACKGROUND

A computing device can be a smartphone, a wearable device, a tablet, a laptop, a desktop computer, or a smart assistant device, for example. The computing device can receive and/or transmit voice calls and/or messages via cables, cellular networks, Wi-Fi, or other channels.

The computing device can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

Figure 1:
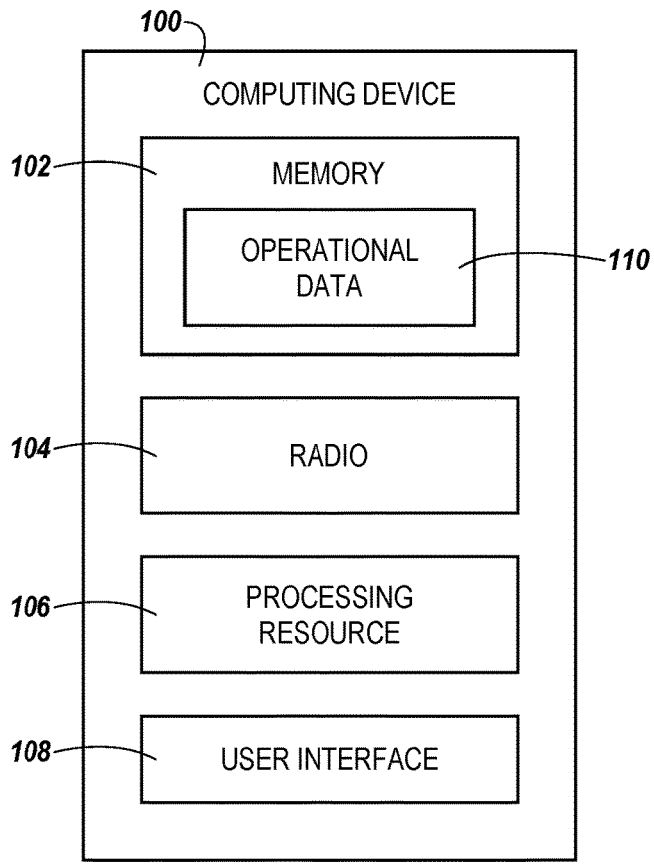
FIG. 1 illustrates an example of a computing device using a cellular signal mesh network in accordance with a number of embodiments of the present disclosure.

The present disclosure includes methods and apparatuses related to determining, via a processing resource of a first computing device, whether a cellular signal of the first computing device is below a threshold cellular signal, transmitting from the first computing device to a second computing device, via a radio of the first computing device, first signaling including data representing a request for operational data of the second computing device in response to determining that the cellular signal of the first computing device is below the threshold cellular signal, receiving from the second computing device, via the radio of the first computing device, second signaling comprising the operational data of the second computing device, and transmitting from the first computing device to the second computing device, via the first radio of the first computing device, third signaling including data representing at least one of a voice call, a video call, or a message in response to receiving the second signaling comprising the operational data.

The threshold cellular signal can be a cellular signal strength needed to transmit signaling including the data representing at least one of the voice call, the video call, or the message from the first computing device to a third computing device. Accordingly, the threshold cellular signal can change depending on the type of operation the first computing device is trying to perform. For example, the threshold cellular signal may be higher when making a video call than when sending a text message.

If the cellular signal is below the threshold cellular signal to transmit the voice call, the video call, and/or the message to a cellular network tower and/or a third computing device (e.g., an intended recipient), the first computing device can search for one or more different computing devices to receive and relay the first computing device's voice call, video call, and/or message by transmitting signaling including data representing the request to the one or more different computing devices able to receive signaling within the threshold cellular signal.

The first computing device can receive operational data including at least one of: a battery level, a cellular availability, a computing device type, a privacy setting, a cellular signal strength, a type of cellular signal, a location, or an available bandwidth of the one or more computing devices. The first computing device can choose the second computing device over the other different computing devices in response to having the most conditions met. In some examples, each operational characteristic included in the operational data can have a weight associated with it. For example, a cellular signal strength may have a higher weight than the type of cellular signal because transmitting the message is more important than the speed of transmission. Accordingly, the first computing device may choose the second computing device with a 3G cellular signal type and a high cellular signal strength rather than another computing device with a 5G cellular signal type and a low cellular signal strength.

The first computing device can send the voice call, video call, and/or message to the selected device. The second computing device, as the selected device, can receive and relay the voice call, video call, and/or message to the cellular network tower and/or the third computing device. The first computing device, the second computing device, the third computing device, and/or the cellular network tower can be included in and communicatively coupled to each other via a cellular signal mesh network.

As used herein, "a number of" something can refer to one or more of such things. For example, a number of computing devices can refer to one or more computing devices. A "plurality" of something intends two or more. Additionally, designators such as "X", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 100 may reference element "0" in FIG. 1, and a similar element may be referenced as 200 in FIG. 2. In some instances, a plurality of similar, but functionally and/or structurally distinguishable, elements or components in the same figure or in different figures may be referenced sequentially with the same element number (e.g., 200-1, 200-2, and 200-X in FIG. 2). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a computing device 100 using a cellular signal mesh network in accordance with a number of embodiments of the present disclosure. The computing device 100 can include a memory 102, a radio 104, a processing resource 106, and a user interface 108.

The memory 102 can be any type of storage medium that can be accessed by the processing resource 106 to perform various examples of the present disclosure. For example, the memory 102 can be a non-transitory computer readable medium having computer readable instructions (e.g., computer program instructions) stored thereon that are executable by the processing resource 106 to determine, via the processing resource 106 of the computing device 100, whether a cellular signal of the computing device 100 is below a threshold cellular signal, transmit from the computing device 100 to a different computing device, via the radio 104 of the computing device 100, first signaling including data representing a request for operational data of the different computing device in response to determining that the cellular signal of the computing device 100 is below the threshold cellular signal, receive from the different computing device, via the radio 104 of the computing device 100, second signaling comprising the operational data of the different computing device, and transmit from the computing device 100 to the different computing device, via the radio 104 of the computing device 100, third signaling including data representing at least one of: a voice call, a video call, or a message in response to receiving the second signaling comprising the operational data. As used herein, signaling can include a communication (e.g., a radio signal) that carries data from one location to another. In some examples, the computing device 100 can include a communication device (e.g., intermediary device), such as, but not limited to, radio 104.

The memory 102 can store operational data 110. The operational data 110 can include operational characteristics, such as, a battery level, a cellular availability, a computing device type, a privacy setting, a cellular signal strength, a type of cellular signal, a location, or an available bandwidth of the computing device 100.

The battery level can be a percentage of battery life and/or an amount of time remaining in the battery of the computing device 100. In some examples, when the battery level is zero or the time remaining in the battery life is zero, the computing device 100 may turn off.

If the computing device 100 is currently using its cellular signal to make a call and/or send a message and/or another computing device is using the cellular signal of the computing device 100 to make a call and/or send a message, the computing device 100 may not have cellular availability. In some examples, the computing device 100 may have cellular availability when the computing device 100 is not using its cellular signal to make a call or send a message and/or when another computing device is not using the cellular signal of the computing device 100 to make a call and/or send a message.

The computing device type can include a brand, a model, an operating system, a software version, a type of memory, a type of processor, a type of radio, and/or a year of the computing device 100. The security or performance of the computing device 100 may be determined based on the computing device type. For example, a computing device with the latest software version may have patched software bugs that security hackers were able to exploit in older software versions to make the computing device more secure than a computing device with an older software version.

The privacy setting of the computing device 100 can also indicate how secure the computing device 100 is. A privacy setting can include whether the computing device 100 requires a code, facial scan, and/or a fingerprint scan, for example. In a number of embodiments, a computing device 100 that requires a facial scan may be determined to be more secure than a computing device 100 requiring a four-digit code, for example.

A cellular signal strength is a signal the computing device 100 receives from a cellular network tower. The cellular signal strength can be measured in decibel-milliwatts (dBm). The cellular signal strength of the computing device 100 can vary depending on the location of the computing device 100 relative to cellular network towers. For example, a computing device 100 located behind a mountain from a cellular network tower may have a lower cellular signal strength than a computing device 100 located on the top of the mountain.

General packet radio service (GPRS), enhanced data rates for GSM evolution (EDGE), third generation (3G), evolved high-speed packet access (HSPA+), fourth generation (4G), and fifth generation (5G) are types of cellular signals. The computing device 100 may only by capable of using certain types of cellular signals. For example, some computing devices may not be able to support 5G. A computing device supporting 5G may be preferred over a computing device supporting 4G because 5G can have greater speed and lower latency than 4G.

A location of the computing device 100 may dictate whether the computing device 100 is used to relay a call and/or message. For example, if the computing device 100 is located between a cellular network tower and a different computing device, the different computing device may send a voice call, a video call, and/or a message to the computing device 100 to relay the voice call, the video call, and/or the message to the cellular network tower. In a number of embodiments, the computing device 100 can be further away from the cellular network tower than the different computing device, but the computing device 100 may have a less obstructed signal to the cellular network tower than the different computing device. For example, the different computing device and the computing device 100 can be located behind a mountain from a cellular tower, however the different computing device may be located at the base of the mountain while the computing device 100 may be located miles away from the base of the mountain so that the mountain is not obstructing the cellular signal of the computing device 100. The different computing device that may have a lower cellular signal because its signal is obstructed by the mountain can send the voice call, the video call, and/or the message to the computing device 100 to relay the voice call, the video call, and/or the message to the cellular network tower.

An available bandwidth of the computing device 100 can dictate whether the computing device 100 is used to relay the voice call, the video call, and/or the message for the different computing device. The available bandwidth of the computing device 100 can determine an amount of data that can be transmitted in a particular amount of time. The computing device 100 may be selected to transmit the voice call, the video call, and/or the message if it has available bandwidth, a higher available bandwidth, and/or the highest available bandwidth because it may be able to transmit the voice call, the video call, and/or the message faster than other computing devices and/or it may be able to transmit a higher quality version of the voice call, the video call, and/or the message than other computing devices.

In a number of embodiments, the computing device 100 can receive requests and/or operational data from other computing devices. The user interface 108 can be generated by computing device 100 in response to receiving requests, operational data, and/or one or more commands. The user interface 108 can be a graphical user interface (GUI) that can provide and/or receive information to and/or from the user of the computing device 100. In a number of embodiments, the user interface 108 can be shown on a display of the computing device 100. For example, a request for operational data can be displayed on the user interface 108. In a number of embodiments, computing device 100 can receive a user command via the user interface 108 in response to displaying the request for operational data.

In some examples, the computing device 100 receiving a request for operational data can determine whether one or more conditions are met prior to transmitting the operational data and/or prior to relaying the voice call, the video call, or the message. For example, if computing device 100 is private, computing device 100 may only transmit operational data to trusted devices and/or only relay a voice call, a video call, and/or a message for a trusted device. In a number of embodiments, a request can include credentials of the computing device requesting the operational data. Computing device 100 can compare the credentials to a number of credentials of trusted devices stored in memory 102. If the credentials match one of the number of credentials of trusted devices, the computing device requesting the operational data can be determined to be a trusted device. In some examples, credentials can include a serial number, an email address, a phone number, and/or an address associated with the computing device.

In a number of embodiments, a central computing device, for example a cloud computing device, can determine whether the computing device 100 should transmit the operational data to the different computing device and/or relay the voice call, the video call, and/or the message for the different computing device. The central computing device can receive the request for operational data and/or the request to relay the voice call, the video call, and/or the message. The central computing device can also receive operational data from computing device 100 and determine whether the computing device 100 should relay the voice call, the video call, and/or the message based on the request and the operational data.

Figure 2:
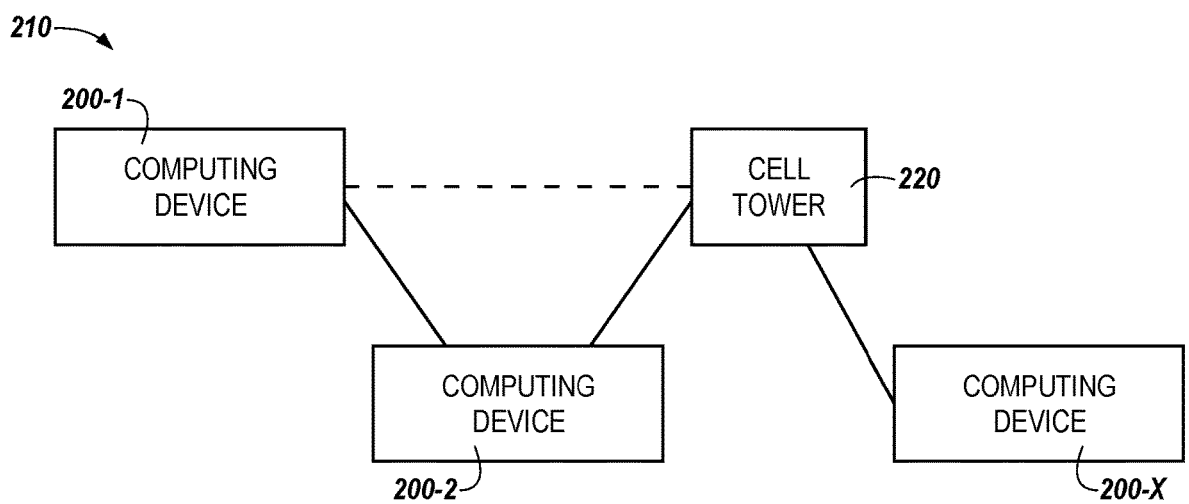
FIG. 2 illustrates an example of a cellular signal mesh network in accordance with a number of embodiments of the present disclosure.

FIG. 2 illustrates an example of a cellular signal mesh network 210 in accordance with a number of embodiments of the present disclosure. The cellular signal mesh network 210 can include a number of computing devices 200-1, 200-2, . . . , 200-X and a number of cell towers 220. Computing devices 200-1, . . . , 200-X can correspond to computing device 100 in FIG. 1.

As illustrated in FIG. 2, computing device 200-1 can send a voice call, a video call, and/or a message to computing device 200-X. To transmit the voice call, the video call, and/or the message directly to cellular network tower 220 to relay the voice call, the video call, and/or the message onto computing device 200-X, the computing device 200-1 can require a cellular signal that exceeds a threshold cellular signal. If computing device 200-1 does not have a cellular signal that exceeds the threshold cellular signal to transmit the call and/or message to cellular network tower 220, computing device 200-1 can search for different computing devices that its cellular signal can reach. Computing device 200-2 can be within computing device 200-1 cellular signal reach. If computing device 200-2 has enough cellular signal to transmit the voice call, the video call, and/or the message to cellular network tower 220, computing device 200-1 can transmit the voice call, the video call, and/or the message to computing device 200-2. Computing device 200-2 can receive and relay the voice call, the video call, and/or the message to cellular network tower 220, and cellular network tower 220 can receive and relay the voice call, the video call, and/or the message to computing device 200-X.

Figure 3:
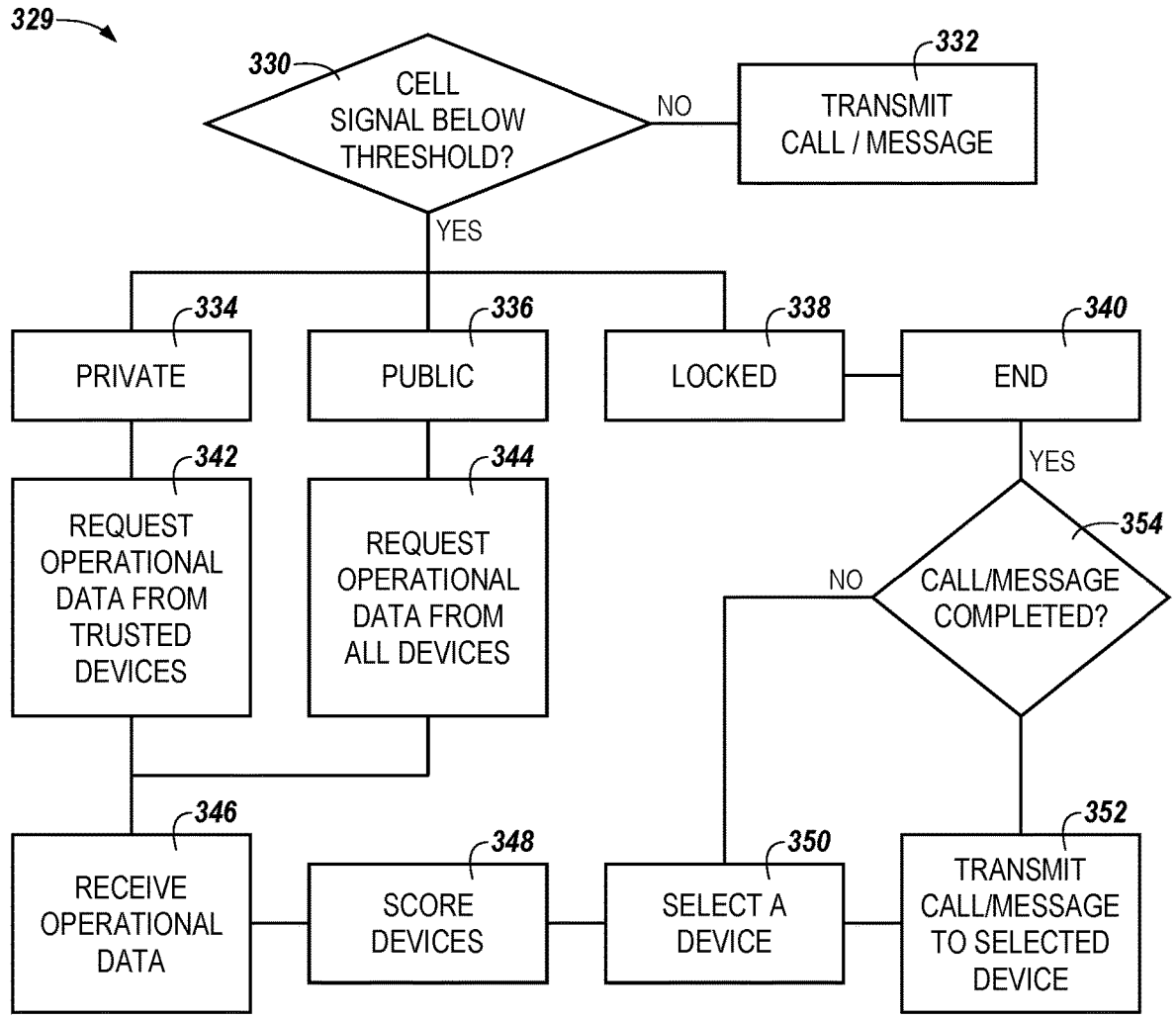
FIG. 3 illustrates a flow diagram associated with a cellular signal mesh network in accordance with a number of embodiments of the present disclosure.

FIG. 3 illustrates a flow diagram 329 associated with a cellular signal mesh network in accordance with a number of embodiments of the present disclosure. The flow diagram 329 illustrates selection of a computing device on a cellular signal mesh network to transmit a voice call, a video call, and/or a message in accordance with a number of embodiments of the present disclosure. First, a computing device (e.g., computing device 200-1 in FIG. 2) can determine whether its cellular signal is below a threshold cellular signal 330. If the cellular signal is not below a threshold cellular signal, the computing device can transmit a call and/or message 332. If the cellular signal is below a threshold cellular signal, the computing device can determine whether it is set to private 334, public 336, or locked 338.

If the computing device is locked 338, the computing device is not allowed to transmit calls and/or messages via other computing devices. Accordingly, the process of selecting a different computing device on a cellular signal mesh network to relay the voice call, the video call, and/or the message ends.

If the computing device is public 336, the computing device can request operational data from all computing devices 344. For example, the computing device can request operational data from any computing device within cellular signal reach of the computing device.

If the computing device is private 334, the computing device can request operational data from trusted devices 342. Trusted devices can be devices with particular hardware. For example, a trusted device can include a particular memory device. In some examples, the particular memory device can be more secure than other memory devices.

In a number of embodiments, the computing device can include a list of trusted devices. If the computing device is private 334, the computing device may only send requests for operational data from computing devices on the list of trusted devices.

The computing device can receive operational data 346 from a number of different computing devices. The computing device can use the operational data to score the number of different computing devices 348. For example, a processing resource (e.g., processing resource 106 in FIG. 1) of the computing device can compare a battery level of one of the number of different computing devices to a threshold battery level and/or a battery level of each of the number of different computing devices. The threshold battery level can be based on the battery level necessary to transmit the voice call, the video call, and/or the message. The threshold battery level can be stored in memory (e.g., memory 102 in FIG. 1) on the computing device. In some examples, a computing device of the number of different computing devices with the highest and/or a higher battery level may be chosen to transmit the voice call, the video call, and/or the message because a computing device with a higher battery level can perform better than a computing device with a lower battery level that may be in a power savings mode with one or more functions disabled to conserve battery power. A computing device of the number of different computing devices can at least be partially scored based on its battery level and/or whether its battery level exceeds the threshold battery level.

In a number of embodiments, a cellularly-available computing device of the number of different computing devices scores higher than a cellularly-unavailable computing device of the number of different computing devices. For example, a computing device of the number of different computing devices is cellularly unavailable if the computing device of the number of different computing devices is currently performing a voice call, a video call, and/or a message.

In some examples, a computing device of the number of different computing devices may score higher depending on the type of device it is. A computing device of the number of different computing devices set to a more secure privacy setting may score higher than a computing device set to a less secure privacy setting and/or a computing device of the number of different computing devices having (e.g., supporting) a particular type of cellular signal may score higher than a computing device having another type of cellular signal.

The processing resource of the computing device can compare a cellular signal strength of a computing device of the number of different computing devices to a threshold cellular signal strength and/or a signal strength of each of the number of different computing devices. The threshold cellular signal strength can be based on the cellular signal strength necessary to transmit the voice call, the video call, and/or the message. The threshold cellular signal strength can be stored in memory on the computing device. A computing device of the number of different computing devices can at least be partially scored based on its cellular signal strength and/or whether its cellular signal strength exceeds the threshold cellular signal strength.

In some examples, the computing device can determine its location using, for example, a global positioning system (GPS). The computing device of the number of different computing devices can include its location in the operational data. The computing device can compare its location with the location of the computing device of the number of different computing devices to determine a distance between them. The computing device can score the computing device of the number of different computing devices based on whether it is within a particular distance and/or whether it is closer to the computing device than the other computing devices of the number of different computing devices. In some examples, the distance between the computing device and the computing device of the number of different computing devices can be a filter to narrow down the number of possible computing devices to request operational data from and/or to relay the voice call, the video call, and/or the message. For example, the computing device can detect ten different computing devices, but only five of the number of different computing devices are between the computing device and a nearest cellular network tower. In response to determining that only five of the number of different computing devices are between the computing device and the nearest cellular network tower, the computing device can send requests for operational data to the five different computing devices in parallel instead of using additional memory and processing resources to send requests to all ten different computing devices.

The processing resource of the computing device can compare an available bandwidth of a computing device of the number of different computing devices to a threshold bandwidth and/or an available bandwidth of each of the number of different computing devices. The threshold bandwidth can be based on the bandwidth necessary to transmit the voice call, the video call, and/or the message. The threshold bandwidth can be stored in memory on the computing device. A computing device of the number of different computing devices can at least be partially scored based on its available bandwidth and/or whether its available bandwidth exceeds the threshold bandwidth.

If the computing device is private, the computing device may only request operational data from, receive operational data from, score, and/or select a computing device of the number of different computing devices that is a trusted device. In some examples, the computing device may be public, but score a computing device of the number of different computing devices higher if it is a trusted computing device. The processing resource of the computing device can compare credentials of each of the number of different computing devices to a number of credentials stored in memory on the computing device to determine which, if any, of the number of different computing devices are trusted.

In a number of embodiments, a central computing device can receive the request, the operational data of each of the number of different computing devices, and/or score each of the number of different computing based on the operational data to determine which computing device of the number of different computing devices should relay a voice call, a video call, and/or a message.

The computing device and/or the central computing device can select a device 350 based on the scoring of the number of different computing devices. Each operational characteristic of the operational data can be weighted. The weights can be preset on the computing device or a user can assign weights to each operational characteristic. The weights can be set based on the priority of the manufacturer and/or user. If the manufacturer and/or user wants the best performance, the type of cellular signal may be weighted higher than a privacy setting. If the manufacturer and/or user wants to keep their data secure, the privacy setting may be weighted higher than the available bandwidth of a computing device of the number of different computing devices, for example.

The computing device can transmit the voice call, the video call, and/or the message to the selected device 352. If the voice call, the video call, and/or the message is completed 354 by the selected computing device, the process of selecting a different computing device to relay the voice call, the video call, and/or the message on the cellular signal mesh network is complete and the process ends 340. The voice call, the video call, and/or the message can be determined to be completed and the voice call, the video call, and/or the message can be marked as complete in response to receiving a confirmation message from the selected computing device.

If the voice call, the video call, and/or the message is not complete, the computing device selects another computing device 350. For example, the computing device and/or the central computing device can select the next computing device with the next highest score and transmit the voice call, the video call, and/or the message to the computing device with the next highest score.

Figure 4:
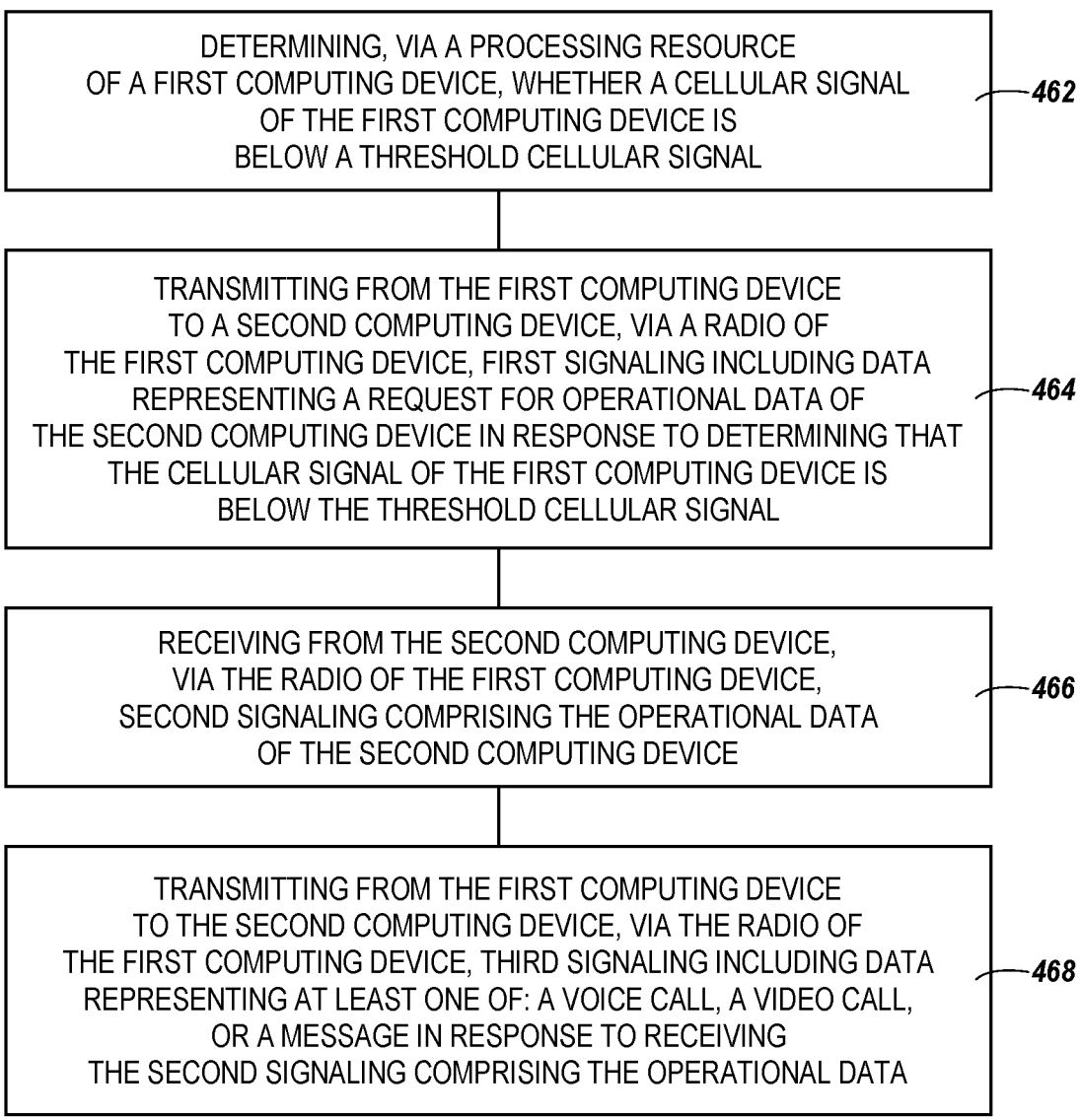
FIG. 4 is a flow diagram of a method associated with a cellular signal mesh network in accordance with a number of embodiments of the present disclosure.

FIG. 4 is a flow diagram of a method 460 associated with a cellular signal mesh network in accordance with a number of embodiments of the present disclosure. The cellular signal mesh network can include a number of computing devices and/or a number of cellular network towers. At block 462, the method 460 can include determining, via a processing resource of a first computing device, whether a cellular signal of the first computing device is below a threshold cellular signal.

The threshold cellular signal can be a signal strength necessary to transmit signaling including the data representing at least one of the voice call, the video call, or the message from the first computing device to a third computing device. Accordingly, the threshold cellular signal can change depending on the type of operation the user is trying to perform. For example, the threshold cellular signal may be higher when making a video call than when sending a text message.

At block 464, the method 460 can include transmitting from the first computing device to a second computing device, via a radio of the first computing device, first signaling including data representing a request for operational data of the second computing device in response to determining that the cellular signal of the first computing device is below the threshold cellular signal. For example, the first computing device can search for a number of computing devices, including the second computing device, to relay the voice call, the video call, and/or the message by transmitting the request for operational data to a number of computing devices. The second computing device can be within cellular signal reach of the first computing device.

If the first computing device is set to public, the first computing device requests operational data from the second computing device even if it is not a trusted device. For example, the first computing device requests operational data from any device, including the second computing device, within cellular signal reach of the first computing device. If the first computing device is set to private, the first computing device requests operational data from the second computing device if it is a trusted device.

At block 466, the method 460 can include receiving from the second computing device, via the radio of the first computing device, second signaling comprising the operational data of the second computing device. In some examples, the operational data can include a battery level, a cellular availability, a computing device type, a privacy setting, a cellular signal strength, a location, and/or an available bandwidth of the second computing device.

At block 468, the method 460 can include transmitting from the first computing device to the second computing device, via the radio of the first computing device, third signaling including data representing at least one of: a voice call, a video call, or a message in response to receiving the second signaling comprising the operational data. In a number of embodiments, the first computing device can transmit the third signaling in response to the battery level of the second computing device exceeding a threshold battery level, the second computing device having cellular availability, the second computing device being a particular type of device, the second computing device being set to a particular privacy setting, the cellular signal strength of the second computing device exceeding a threshold cellular signal strength, the second computing device having a particular type of cellular signal, the second computing device being within a particular distance of the first computing device, and/or the available bandwidth of the second computing device exceeding a threshold bandwidth.

In some examples the second computing device can receive and relay the voice call, the video call, and/or the message to a cellular network tower. The cellular network tower can receive and relay the voice call, the video call, and/or the message to the intended recipient, the third computing device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    determining, via a processing resource of a first computing device, whether a cellular signal of the first computing device is below a threshold cellular signal;
    transmitting from the first computing device to a number of computing devices including a second computing device, via a radio of the first computing device, first signaling including data representing a request for operational data in response to determining that the cellular signal of the first computing device is below the threshold cellular signal;
    receiving, via the radio of the first computing device, second signaling comprising the operational data of each of the number of computing devices including the second computing device, wherein the operational data comprises at least one of: cellular availability, a privacy setting, or an available bandwidth of each of the number of computing devices including the second computing device;
    scoring the number of computing devices in response to receiving, via the radio of the first computing device, the second signaling comprising the operation data from each of the number of computing devices;

selecting the second computing device with a highest score of the number of computing devices; and
transmitting from the first computing device to the second computing device, via the radio of the first computing device, third signaling including data representing at least one of: a voice call, a video call, or a message in response to receiving the second signaling comprising the operational data.

2. The method of claim 1, comprising receiving the second signaling comprising the operational data of the second computing device, wherein the operational data comprises at least one of: a battery level, a computing device type, a cellular signal strength, or a location of the second computing device.

3. The method of claim 2, comprising:
comparing, at the processing resource of the first computing device, the battery level of the second computing device to a threshold battery level; and
transmitting from the first computing device to the second computing device, via the radio of the first computing device, the third signaling including the data representing at least one of: the voice call, the video call, or the message in response to the battery level of the second computing device exceeding the threshold battery level.

4. The method of claim 3, comprising:
determining, at the processing resource of the first computing device, the threshold battery level for transmitting at least one of: the voice call, the video call, or the message; and
storing the threshold battery level in memory of the first computing device.

5. The method of claim 2, comprising transmitting from the first computing device to the second computing device, via the radio of the first computing device, the third signaling including the data representing at least one of: the voice call, the video call, or the message in response to the second computing device being available.

6. The method of claim 2, comprising transmitting from the first computing device to the second computing device, via the radio of the first computing device, the third signaling including the data representing at least one of: the voice call, the video call, or the message in response to the second computing device being a particular type of device.

7. The method of claim 2, comprising transmitting from the first computing device to the second computing device, via the radio of the first computing device, the third signaling including the data representing at least one of: the voice call, the video call, or the message in response to the second computing device being set to a particular privacy setting.

8. The method of claim 2, comprising:
comparing, at the processing resource of the first computing device, the cellular signal strength of the second computing device to a threshold cellular signal strength; and
transmitting from the first computing device to the second computing device, via the radio of the first computing device, the third signaling including the data representing at least one of: the voice call, the video call, or the message in response to the cellular signal strength of the second computing device exceeding the threshold cellular signal strength.

9. The method of claim 8, comprising:
determining, at the processing resource of the first computing device, the threshold cellular signal strength for transmitting at least one of: the voice call, the video call, or the message; and
storing the threshold cellular signal strength in memory of the first computing device.

10. The method of claim 2, comprising transmitting from the first computing device to the second computing device, via the radio of the first computing device, the third signaling including the data representing at least one of: the voice call, the video call, or the message in response to the second computing device having a particular type of cellular signal.

11. The method of claim 2, comprising:
determining a location of the first computing device;
determining, at the processing resource of the first computing device, a distance between the location of the first computing device and the location of the second computing device; and
transmitting from the first computing device to the second computing device, via the radio of the first computing device, the third signaling including the data representing at least one of: the voice call, the video call, or the message in response to the second computing device being within a particular distance of the first computing device.

12. The method of claim 2, comprising:
comparing, at the processing resource of the first computing device, the available bandwidth of the second computing device to a threshold bandwidth; and
transmitting from the first computing device to the second computing device, via the radio of the first computing device, the third signaling including the data representing at least one of: the voice call, the video call, or the message in response to the available bandwidth of the second computing device exceeding the threshold bandwidth.

13. The method of claim 12, comprising:
determining, at the processing resource of the first computing device, the threshold bandwidth for transmitting at least one of: the voice call, the video call, or the message; and
storing the threshold bandwidth in memory of the first computing device.

14. An apparatus, comprising:
a memory;
a radio; and
a processing resource configured to execute instructions stored in the memory to:
store operational data of the apparatus in the memory;
receive, via the radio, first signaling including data representing a request for the operational data of the apparatus from a computing device;
transmit, via the radio, second signaling including the operational data of the apparatus to the computing device for scoring against a number of computing devices, wherein the operational data of the apparatus comprises at least one of: cellular availability, a privacy setting, or an available bandwidth of the apparatus;
receive, via the radio, third signaling including data representing at least one of: a voice call, a video call, or a message from the computing device in response to being selected in response to scoring a highest score of the number of computing devices; and
transmit, via the radio, fourth signaling including the data representing at least one of: the voice call, the video call, or the message to a cellular network tower.

15. The apparatus of claim 14, wherein the processing resource is configured to execute instructions stored in the memory to:

display the request for the operational data of the apparatus on a user interface of the apparatus in response to receiving the first signaling;

receive a user command via the user interface in response to displaying the request for the operational data of the apparatus on the user interface; and transmit, via the radio, the second signaling comprising the operational data of the apparatus.

16. The apparatus of claim 14, wherein the processing resource is configured to execute instructions stored in the memory to:

receive, via the radio, the first signaling including the data representing the request for the operational data of the apparatus and data representing credentials of the computing device; and transmit, via the radio, at least one of: the second signaling comprising the operational data of the apparatus or the fourth signaling including the data representing at least one of: the voice call, the video call, or the message at least partially based on the credentials of the computing device.

17. An apparatus, comprising:
a memory;
a radio; and
a processing resource configured to execute instructions stored in the memory to:
determine whether a cellular signal of the apparatus is below a threshold cellular signal for transmitting at least one of: a voice call, a video call, or a message;
transmit, via the radio, first signaling including data representing a request for operational data to a plurality of computing devices in response to determining that the cellular signal of the apparatus is below the threshold cellular signal;

receive, via the radio, second signaling comprising operational data from a number of the plurality of computing devices, wherein the operational data comprises at least one of: cellular availability, a privacy setting, or an available bandwidth of the number of the plurality of computing devices;

score the number of computing devices in response to receiving, via the radio, the second signaling comprising the operational data from the number of computing devices;

select a computing device of the number of computing devices with a highest score; and transmit, via the radio, third signaling including data representing at least one of: the voice call, the video call, or the message to the selected computing device.

18. The apparatus of claim 17, wherein the processing resource is configured to execute instructions stored in the memory to:

receive, via the radio, fourth signaling comprising a message from the selected computing device;

select a different computing device of the number of computing devices with a next highest score; and transmit, via the radio, fifth signaling including the data representing at least one of: the voice call, the video call, or the message to the different computing device.

19. The apparatus of claim 17, wherein the processing resource is configured to execute instructions stored in the memory to:

receive, via the radio, fourth signaling comprising a message from the selected computing device; and mark the message as transmitted in response to receiving the fourth signaling comprising the message from the selected computing device.

* * * * *